Figure 2:
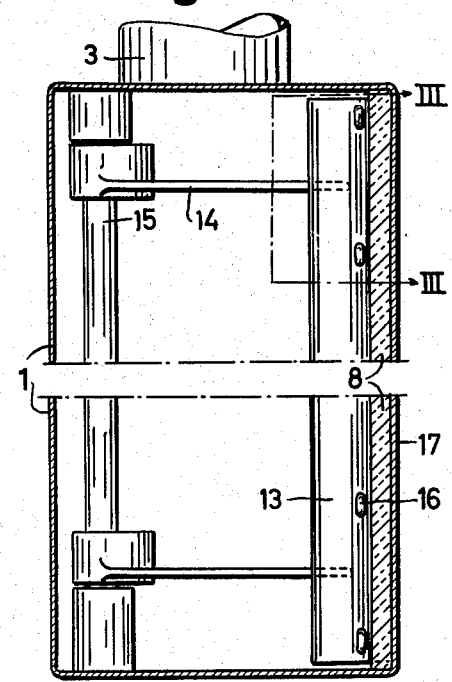

Oct. 11, 1960 S. H. KRISTIANSEN 2,955,522
AIR INLET DEVICE FOR VENTILATING PLANTS
Filed Nov. 14, 1957

United States Patent Office 2,955,522
Patented Oct. 11, 1960

2,955,522
AIR INLET DEVICE FOR VENTILATING PLANTS

Svend Helge Kristiansen, Naestved, Denmark, assignor, by mesne assignments, to Hi-Press Air Conditioning of America, Inc., New York, N.Y.

Filed Nov. 14, 1957, Ser. No. 696,491

3 Claims. (Cl. 98—40)

In ventilating plants for living spaces in buildings and means of transportation it is of great importance that the devices through which the fresh air is supplied should operate at the lowest possible noise level. To attain this end the ordinary practice is to provide a sound trap between the supply duct through which the fresh air is conveyed to the inlet apparatus and the outlet nozzles or corresponding outlet apertures through which the primary air leaves the inlet device and is mixed with room air; a particularly efficient design is one in which the sound trap consists of two or more sluice chambers connected in series by a connecting aperture in the shape of a long slot extending through the entire width or the greater part of the width of the inlet device.

The invention aims at a further improvement of the sound-deadening in air inlet devices of the aforementioned type in which a sound trap is provided between the supply duct and the outlet nozzles, the said sound trap comprising at least two sluice chambers connected in series by means of a long slot extending through the whole or the greater part of the width of the inlet device, and the invention is designed particularly—but not exclusively—for ventilating plants in which the supply air is admitted at a sufficient pressure and velocity to cause a circulation of the room air through induction.

The main characteristic of the invention is that the inlet opening of the first of the series-connected sluice chambers is itself a long slot preferably parallel to and of the same length as the connecting slot between the sluice chambers.

It has been found that this design of the inlet opening through which the air is admitted into the first of the sluice chambers of the sound trap results in an unexpected considerable increase in the efficiency of the sound trap, presumably due to the more even distribution of the air over the entire length of the first sluice chamber, whereby the sound-deadening effect of the latter is utilized to the fullest possible extent.

In an efficient embodiment of the invention the inlet slot of the first sluice chamber would be formed between the rear wall of the inlet device and a projection extending from the front wall of the device inwardly to the vicinity of the rear wall, forming a partition between the first sluice chamber and an inlet chamber which would be most advantageously placed near the bottom of the device and to which the fresh air supply pipe is connected.

This will make a simple and compact construction of the whole air inlet device and render it possible to connect the fresh air supply pipe at any desired place without detriment to the efficiency and mode of operation of the sound trap.

Another object of the invention is to provide a simple device to regulate the volume of inlet air, designed and acting in such a way as to give no rise to noises even at a high degree of throttling of the air supply.

For the purpose of providing such a regulating device the inlet device of this invention is characterized in having a valve member shaped as a long fillet acting in conjunction with the inlet slot of the first sluice chamber. On being made to fill the width of the slot to a higher or less degree, this valve will secure an efficient and accurately adjustable regulation of the volume of air passing through the slot, without causing noises or any change in the mode of operation of the series-connected sluice chambers.

For the purpose of the invention this valve fillet should be given a wedge shaped cross section and should be so designed that it could be edged into the slot until it touched the longitudinal edges of the slot with its lateral faces. This would result in the valve having a relatively long travel between fully closed and fully open position, which would render it easier to adjust the volume of air to the exact desired amount.

The valve member might appropriately be made in the shape of a light thin-walled pipe, e.g. a steel or aluminium pipe, preferably wedge-shaped in cross section, for instance oval or egg-shaped; for the purpose of the invention it may be attached, preferably with some freedom of movement in the transverse direction, to a pair of arms located in the air inlet chamber and fastened to an operating shaft placed in the same chamber parallel to the slot.

Figure 3:
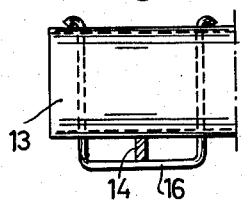

The invention will be described in detail in the following with reference to the drawings showing in Fig. 1 a schematic cross section through an embodiment of an air inlet device according to the invention, in Fig. 2 a section along line II—II in Fig. 1, and in Fig. 3 a detail as seen along line III—III in Fig. 2.

The air inlet device illustrated consists in a long, narrow steelplate box, having a front wall 1 and a rear wall 17 as well as air outlet nozzles 2 punched out of the upper wall. An air supply pipe opens into the lower part of the box; as shown it may be connected to one of the end walls of the box or, as indicated by the broken lines, it may be admitted at the bottom. However, any kind of connection that would meet existing conditions would be possible.

Through the air supply pipe 3 the supply air is admitted in the usual way and in any desired state of conditioning, generally at a considerable pressure and a corresponding velocity. The supply air flows through the inlet device and escapes through nozzles 2 in front of which it picks up room air through induction, causing the said room air to circulate generally through a cabinet or similar structure (not shown in the drawing) of which the air inlet device forms part.

Between the supply pipe 3 and the outlet nozzles 2 there is a sound trap consisting of two sluice chambers 4 and 5 both of them extending through the entire width of the inlet device and interconnected by means of a comparatively narrow slot 6 below the edge of a partition 7 between chambers 4 and 5 made of a suitable absorptive material.

The bottom of sluice chamber 4 is formed by a projection 9, extending from the front wall of the inlet device to the vicinity of the rear wall 17, leaving open, however, a slot 11 which extends through the entire length of the device and acts as an inlet opening for the air delivered into sluice chamber 4. As shown in Fig. 1 the rear wall of the inlet device as well as the projection 9 are lined with sound-deadening materials (8 and 10, respectively), these materials forming the side walls of the slot 11. Below the projection 9 there is a space 12 which acts as an inlet chamber into which the supply air is delivered. The said space also contains a regulating shaft 15 actuated by suitable means (not shown), for which purpose one end of the rod may be extended through the wall of the device. The shaft 15 carries two parallel arms 14 which extend towards the rear wall of the inlet device 17, supporting on their ends a fillet-shaped valve member 13. Being wedge-shaped in cross section this valve member may be partially inserted through the slot 11 with its sharp edge foremost, whereby its lateral faces will act as a valve against the sides of the slot, whereas the sides of the slot will form a valve seat.

Figure 1:
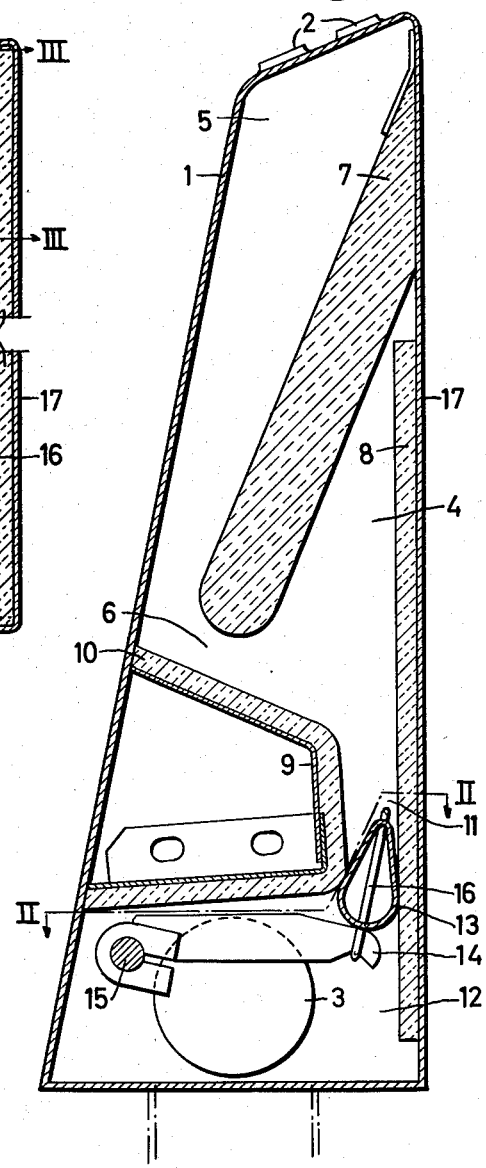

The valve member is constructed in the shape of a steel or aluminium pipe of wedge-shaped cross section; it is attached to the arms 14 by means of two resilient clamps 16, which provides a certain amount of free movement in the transverse direction to secure that the valve member will always bear against both sides of the slot 11 when in closed position, cf. Fig. 1.

The arrangement of the individual parts of the device may differ from the one illustrated, the essence of the matter being merely that in an inlet device containing a sound trap consisting of at least two extended sluice chambers interconnected by means of a long, narrow slot, the inlet opening of the first sluice chamber should also be made in the shape of a long, narrow slot, preferably parallel to the connecting slot between the two sluice chambers. The coating of the chambers with some sound-deadening material, for instance felt, may be more or less extensive than shown, and the inlet slot of the first sluice chamber may be longer or shorter in the direction of the air flow than shown in the embodiment illustrated.

If the device includes a valve member which is to operate in conjunction with the said inlet slot, this member may be located inside the first sluice chamber instead of outside as illustrated, and it need not be made as a wedge-shaped fillet, as a circular or some other cross section would be equally applicable. However, it is advisable to select a cross section that will render it possible to open the slot gradually for the purpose of air admission. The valve member may be moved by some other method than by means of revolving arms—instead it may, for instance, slide in some suitable guide.

What I claim is:

1. An air distributing device for a ventilator supplying air at a pressure sufficient to cause circulation of room air by induction comprising a structure having a plurality of side walls, a top wall, and a bottom wall forming an enclosure, inlet duct means entering the enclosure near the bottom wall and adapted to be connected to a source of air under pressure, outlet nozzle means in the top wall to release air from the enclosure, and a sound trap disposed within the enclosure between the inlet duct means and the outlet nozzle means comprising a first partition adjacent to the inlet duct means extending transversely the length of the enclosure from a first side wall to a location near a second side wall leaving a first elongated slot extending substantially the length of the enclosure, and a second partition extending transversely the length of the enclosure and directed from the second side wall at a location near the outlet nozzle means downwardly and outwardly toward the first partition and said one side wall forming elongated slots between these members and the second partition extending substantially the length of the enclosure, thereby providing a first chamber bounded by the first and second partitions and the second side wall and a second chamber bounded by the first side wall, the second partition and the top wall.

2. An air distributing device according to claim 1 including valve means to control the flow of air into the enclosure comprising an elongated bar member of wedge-shaped cross-section and movable support means mounted within the enclosure for moving the smallest edge of the bar into and out of one of the elongated slots.

3. An air distributing device according to claim 1 wherein each of the partitions has a sound-absorbing surface.

References Cited in the file of this patent

UNITED STATES PATENTS

| | | |
|---|---|---|
| 1,821,688 | Bourne | Sept. 1, 1931 |
| 1,950,792 | Green | Mar. 13, 1934 |
| 2,529,592 | Boyle | Nov. 14, 1950 |
| 2,724,320 | Tutt | Nov. 22, 1955 |
| 2,727,454 | Jones | Dec. 20, 1955 |
| 2,745,332 | Cotts | May 15, 1956 |
| 2,790,371 | Wheeler | Apr. 30, 1957 |
| 2,813,474 | Kurth | Nov. 19, 1957 |
| 2,913,227 | Bottorf et al. | Nov. 17, 1959 |